US010896199B2

(12) United States Patent
Day et al.

(10) Patent No.: US 10,896,199 B2
(45) Date of Patent: *Jan. 19, 2021

(54) APPARATUS AND METHOD FOR MANAGING STORAGE COPY SERVICES SYSTEMS

(71) Applicant: INTERNATIONAL BUSINESS MACHINES CORPORATION, Armonk, NY (US)

(72) Inventors: Kenneth F. Day, Tucson, AZ (US); Robert B. Nicholson, Southsea (GB); Lee J. Sanders, Havant (GB); William J. Scales, Fareham (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 714 days.

This patent is subject to a terminal disclaimer.

(21) Appl. No.: 15/416,250

(22) Filed: Jan. 26, 2017

(65) Prior Publication Data
US 2017/0131914 A1 May 11, 2017

Related U.S. Application Data

(63) Continuation of application No. 14/874,654, filed on Oct. 5, 2015, now Pat. No. 9,591,073, which is a
(Continued)

(51) Int. Cl.
G06F 16/27 (2019.01)
G06F 16/23 (2019.01)
G06F 16/182 (2019.01)

(52) U.S. Cl.
CPC .......... *G06F 16/27* (2019.01); *G06F 16/1844* (2019.01); *G06F 16/2358* (2019.01)

(58) Field of Classification Search
CPC .... G06F 16/27; G06F 16/1844; G06F 16/172; G06F 16/184; G06F 16/2358; G06F 16/289; G06F 16/951
(Continued)

(56) References Cited

U.S. PATENT DOCUMENTS 5,586,291 A 12/1996 Lasker et al.
6,018,779 A * 1/2000 Blumenau ............. G06F 13/387
710/6
(Continued)

FOREIGN PATENT DOCUMENTS

CN 1928830 A 3/2007
JP 2005157825 A 6/2005
(Continued)

OTHER PUBLICATIONS

Blunden et al., "Implementing ESS Copy Services on S/390," Announcement IBM International Technical Supprt Organization, IBM, XP002337035, pp. 1-10, Dec. 1, 2000.

*Primary Examiner* — James Trujillo
*Assistant Examiner* — Fariborz Khoshnoodi
(74) *Attorney, Agent, or Firm* — Griffiths & Seaton PLLC

(57) ABSTRACT

An apparatus for controlling a storage system having a data replication function, comprises: a storage array component being operable to send notification to a replication engine that a write of data to a primary storage location by a host is subject to data replication; the replication engine being operable to receive the notification and in response to instruct the storage array to copy the data to a secondary storage location; wherein the data is copied to the secondary storage location unmediated by the replication engine.

15 Claims, 8 Drawing Sheets

Related U.S. Application Data continuation of application No. 11/945,844, filed on Nov. 27, 2007, now Pat. No. 9,152,515.

(58) Field of Classification Search
USPC .................................................. 707/652, 654
See application file for complete search history.

(56) References Cited

U.S. PATENT DOCUMENTS

| | | | |
|---|---|---|---|
| 6,161,192 | A | 12/2000 | Lubbers et al. |
| 6,889,309 | B1 | 5/2005 | Oliveira et al. |
| 7,519,633 | B2 | 4/2009 | Wolfgang et al. |
| 8,024,534 | B2 | 9/2011 | Bartfai et al. |
| 8,131,957 | B2 | 3/2012 | Bartfai et al. |
| 2003/0135514 | A1 | 7/2003 | Patel et al. |
| 2004/0230704 | A1 | 11/2004 | Balasubramanian et al. |
| 2004/0260873 | A1 | 12/2004 | Watanabe |
| 2005/0018565 | A1 | 1/2005 | Kanaoka |
| 2005/0108565 | A1 | 5/2005 | Blea et al. |
| 2005/0195735 | A1* | 9/2005 | Brady ............... G06F 16/273 370/216 |
| 2005/0195753 | A1 | 9/2005 | Chaskar et al. |
| 2005/0278501 | A1* | 12/2005 | Taguchi ............. G06F 12/0866 711/203 |
| 2006/0053088 | A1* | 3/2006 | Ali .................... G06F 11/1469 |
| 2006/0053304 | A1* | 3/2006 | Fries ................. G06F 11/1451 713/189 |
| 2006/0174080 | A1 | 8/2006 | Kern |
| 2006/0179082 | A1* | 8/2006 | Boyd ................ G06F 11/1662 |
| 2006/0242489 | A1* | 10/2006 | Brockway ............... G06F 7/00 714/718 |
| 2007/0050570 | A1 | 3/2007 | Blea et al. |
| 2007/0050573 | A1* | 3/2007 | Arakawa ............ G06F 11/2058 711/162 |
| 2008/0016301 | A1* | 1/2008 | Chen ................. G06F 11/1666 711/162 |
| 2008/0126404 | A1* | 5/2008 | Slik ................... G06F 16/1774 |

FOREIGN PATENT DOCUMENTS

| | | |
|---|---|---|
| JP | 2006221628 A | 8/2006 |
| JP | 2006227923 A | 8/2006 |
| JP | 2007066154 A | 3/2007 |
| JP | 2007072847 A | 3/2007 |
| WO | 2005048124 A2 | 5/2005 |

* cited by examiner

APPARATUS AND METHOD FOR MANAGING STORAGE COPY SERVICES SYSTEMS

CROSS-REFERENCE TO RELATED APPLICATIONS

This Application is a Continuation of U.S. patent application Ser. No. 14/874,654, filed on Oct. 5, 2015, which is a Continuation of U.S. patent application Ser. No. 11/945,844, filed on Nov. 27, 2007, the contents of both hereby incorporated by reference.

FIELD OF THE INVENTION

The present invention relates to a technology for improved management of storage systems, and more particularly to a technology for managing storage systems having storage copy services.

BACKGROUND OF THE INVENTION

One of the important services provided by modern storage controller products is a copy services solution. Copy services include, but are not limited to, remote copy, point in time copy, and continuous data protection (CDP). These copy services are today typically implemented inside storage controllers as an integral part of the storage controller microcode. Recently, though, a new approach has emerged in the industry whereby copy services are implemented in an appliance which will here be called a "Replication Engine", rather than inside a storage controller.

All the above copy services, or replication, functions rely on "writes" of the protected data being "split". What this means is that the copy services appliance receives a notification that a write is ongoing synchronously with the write being performed to the storage controller.

In systems according to the prior art there are, broadly speaking, two distinct implementations of this splitter technology. These arrangements are shown in FIG. 1. Firstly, there is the technique of using a splitter implemented in the fabric. This is shown on the left-hand side of FIG. 1, where host 100 is connected to SAN fabric 104, and SAN-based splitter 116 performs primary I/O to physical storage 106. SAN-based splitter 116 also directs I/O to replication engine 110, in which the copy services component 112 resides and performs copy services. The second technique is to implement a splitter in the host software stack, such as the device driver. The host operating system's logical volume manager (LVM) can also be used for this function. This arrangement is shown on the right-hand side of FIG. 1, where splitter 114 is connected to host 102 above the fabric level 104. In each of these implementations, the write data is sent from the splitter to the replication engine.

The disadvantages of all these schemes are:

1. Multiple different implementations are required to cover all host types and switch types.

2. Splitting in the host consumes host CPU MIPS and doubles write bandwidth requirement on the host to switch links.

3. Hosts and switches typically do not have access to non volatile memory. This means that it is hard for the hosts to reliably keep track of the state of in-flight writes, forcing design compromises which either impact performance, robustness or the speed at which the solution can recover from loss of power.

U.S. patent application Ser. No. 11/840,179 discloses a technique that permits implementation of a generic splitting protocol inside the Storage controller rather than in the host or in the storage area network (SAN). This protocol provides the infrastructure to build a common Copy Function across several different Storage Controllers. The interface is intended to be a simple interface that makes it possible to connect storage arrays (SA) to replication engines (RE) and to each other and allow new replication functions to be more rapidly deployed. This implementation relies on the use of a protocol in which each write command received by the splitter is duplicated and sent in parallel to both the primary storage and also to the replication engine. The replication engine has some storage, usually (but not required to be) provided by the same storage array that contains the splitter. The RE uses this as a "repository" to implement its copy services. This repository will typically contain the data that has been written to the primary disks, together possibly with older copies of the data which was on the primary disks at some time in the past, together with metadata. In this protocol, the commands used transfer both control information and the data that was received from the host. The expected implementation of a replication engine is that it will not include disk storage but will instead use storage LUNs that are provided by the storage array. Thus the data flow for a simple write which the RE just needs to store one copy of in its repository is: Host→storage controller→Replication Engine→storage controller→disks (repository storage). Of course in reality, the RE will probably need to associate some metadata with the data and may also need to copy data from one place in its repository to another place in the repository. It may also need to copy data between the primary disks and the repository.

Such an arrangement is illustrated in FIG. 2, in which are additionally illustrated a storage appliance 200 having a splitter 202 and a storage virtualization controller 204 having a splitter 206.

The data flow for a split write according to all of these implementations of the prior art may be shown in simplified form as illustrated in FIG. 3, in a which a host 300 writes data at flow 1 to storage array 302. Storage array 302 flows the data to the primary physical storage 306 at flow 2 and to replication engine 304 at flow 3. Replication engine 304 adds metadata and flows the data and metadata to the storage array 302 at flow 4, and storage array 302 flows the data to the secondary physical storage 308 at flow 5.

Flowing the data through the RE has the following disadvantages:

The data has to make at least an extra two passes across the network and across the busses that connect the Storage array memory to the network. This limits the bandwidth that can be achieved by the solution for any given hardware platform.

If the storage controller implements a data format including check-bytes for data integrity checking then either the RE has to participate in the scheme or the data is unprotected in this part of the data flow.

It would thus be desirable to have an improved technology for managing storage systems having storage copy services.

SUMMARY OF THE INVENTION

The present invention accordingly provides, in a first aspect, an apparatus for controlling a storage system having a data replication function, comprising: a primary storage location; a secondary storage location; a replication engine;

and a storage array component coupled to the primary storage location, the secondary storage location, and the replication engine, the storage array component configured to receive, from a host, a write command to write data to the primary storage location, write the data to the primary storage location, and to send a command descriptor block (CDB) describing the write command, without sending the data, to the replication engine in response to receiving the write command, the CDB indicating that the data is subject to data replication in the secondary storage location, wherein: the replication engine is configured to receive the CDB and, in response thereto, generate metadata for protecting the data based on the CDB and transmit the generated metadata to the storage array component.

Embodiments of the present invention, in its broadest aspect, provide apparatus and methods for exchanging control sequences and metadata with the replication engine to allow it to implement copy services without the data itself flowing through the replication engine.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

Figure 1:
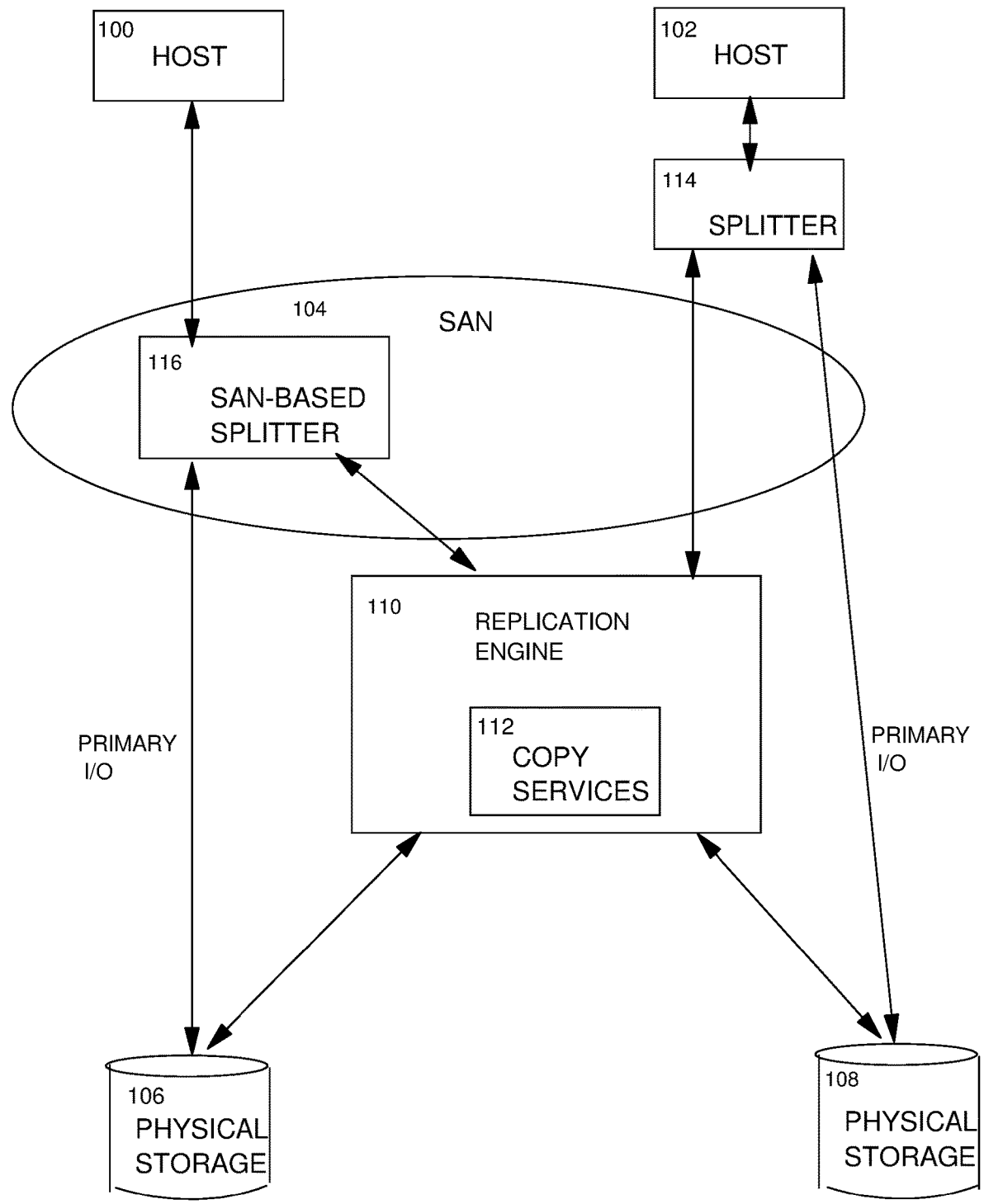
FIG. 1 shows in schematic form two possible arrangements of apparatus according to the prior art.
Figure 2:
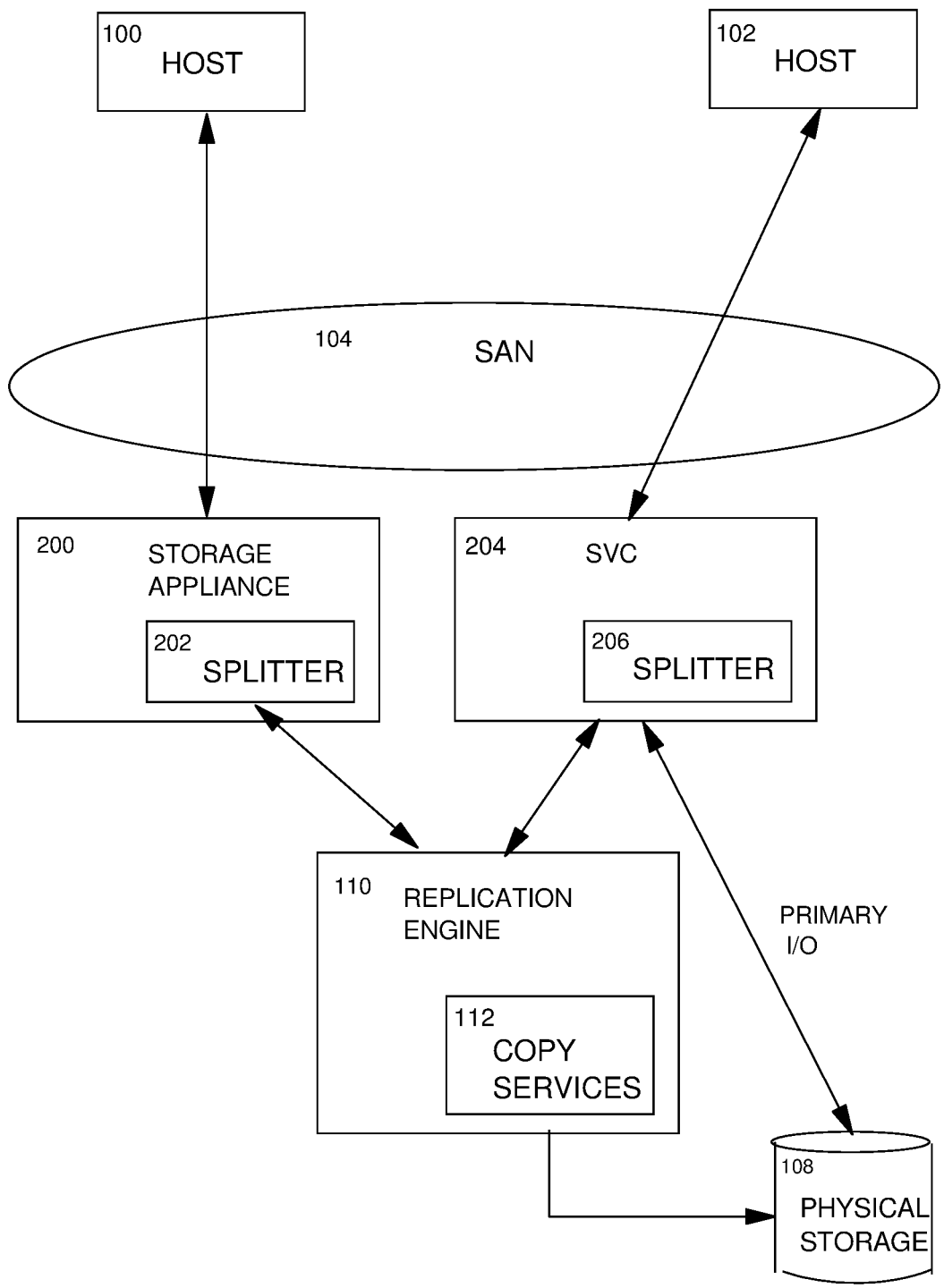
FIG. 2 shows in schematic form two possible arrangements of apparatus according to one proposed improvement to the prior art.
Figure 3:
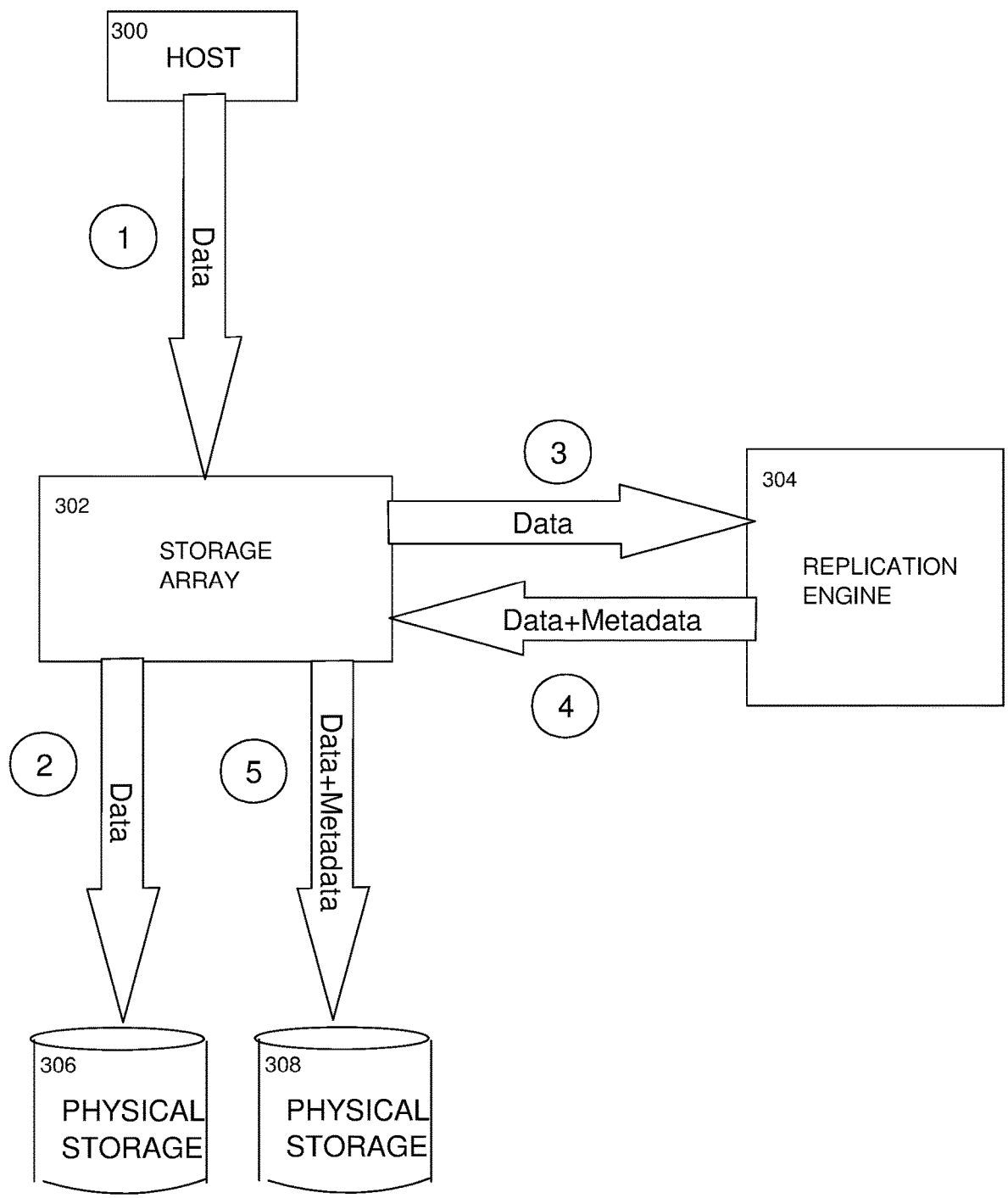
FIG. 3 shows in simplified schematic form the flows of data for a split write according to the prior art schemes illustrated in FIGS. 1 and 2.

A preferred embodiment of the present invention will now be described, with reference to the figures. As described above, FIGS. 1 to 3 depict arrangements of apparatus and data flows according to the prior art. These have been described above as forming the background to the present invention.

In very broad terms, the preferred embodiments of the present invention provide hardware and software according to a new and improved protocol. The protocol informs the replication engine of all new writes to volumes to which the replication engine has subscribed. An interface is provided which allows the replication engine to direct the newly written data to an area on the replication engine repository volumes. The interface also allows metadata generated by the RE to be added to the data as it is written to the repository and allows data movement between the repository and the primary volumes. The protocol allows for the necessary serialization of these data movements and allows consistency groups to be created between volumes. It also allows volumes to be created to access a "copy services view" of the data in the repository such as a historical view of data in a CDP engine.

As will be clear to one of ordinary skill in the art, an SA→RE→SA data flow is necessary when the RE needs to obtain a copy of the data, perhaps to send it to a RE at a remote site (Global Mirror/MetroMirror). However, provided that the new and improved protocol according to a preferred embodiment of the present invention is used, for functions such as Continuous Data Protection (CDP) and snapshot or T0 copying, there is no need for the server's data to actually flow through the replication engine. The preferred embodiment of the present invention provides a scheme to avoid this.

For the purposes of the description of preferred embodiments of the present invention, any "in band virtualization appliance" such as the IBM System Storage SAN Volume controller is treated as a storage array (SA). The term "storage array" is not therefore limited to the mere physical arrangement of storage media, but encompasses the entirety of the hardware and software provision for the control of and storage of data in the array.

Some advantages of using the preferred embodiments of the present invention rather than the splitter protocol described above are:

- As the data does not have to flow into the RE and then back out, the requirements for bandwidth are much reduced in the SA, the SAN and the RE. For a given hardware system this will allow significantly higher data rates to be achieved.
- As the data does not have to flow through the RE, the scheme works even for SAS that embed data integrity fields into the data. The RE does not need to know that the SA has done this and does not need to have support for this.
- As the data does not flow between the SA and RE, the link between the SA and the RE can be implemented using a lower bandwidth interconnect technology. Potentially, the link could be implemented using Ethernet rather than fibre channel. This may save significant development expense and time to market for a storage array that does not currently implement a Fibre Channel initiator.

The basic premise is that a "splitter" will be written in the Storage Array (SA) that will essentially mirror the write data between the primary volume and the RE. It is intended that the storage used by the RE will be on the same SA appliance as that is managing the primary volume.

The exemplary descriptions of the Figures given below explain how the SA communicates customer write data to the RE and how the RE provides CDP for the customer data. The command sequences are intended to be vendor specific SCSI commands, rather than the standard SCSI commands. A SCSI "Read" is thus not meant to indicate a real SCSI read, but a command that looks like a read with the direction of the data transfer going from the target to the initiator (SA being the initiator).

One known example of an RE product wraps Host customer data with header and footer information. This information is the RE metadata—the RE uses this information to manage the CDP'd primary volume data accordingly. RE devices may also choose to stripe data the CDP data and Metadata across the LUNs, and therefore some of the commands require lists of LUNs and LBAs.

Figure 4:
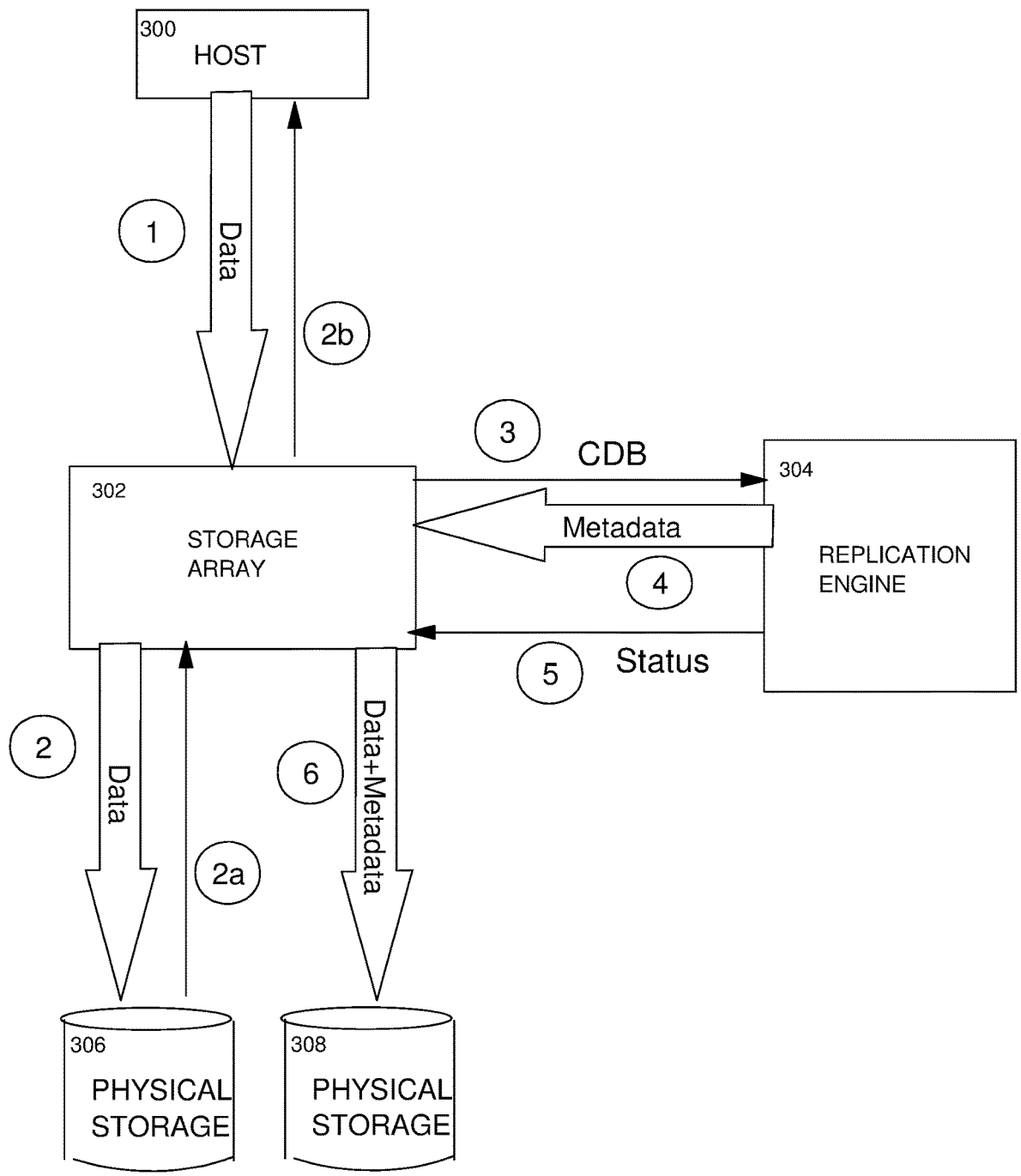
FIG. 4 shows in simplified schematic form the flows of data for a split write according to a preferred embodiment of the present invention.

Turning now to FIG. 4, there is shown in simplified schematic form the flows of data for a split write according to a preferred embodiment of the present invention. Host 300 flows the write data to the storage array (SA) 302 at flow 1, and SA 302 flows the write data to the primary physical storage 306 at flow 2. Completion is returned by primary physical storage 306 at flow 2a, and SA 302 returns completion to host 300 at flow 2b. The command descriptor block (CDB) for the write is sent by SA 302 to replication engine (RE) 304 at flow 3. RE 304 generates metadata and returns it to SA 302 at flow 4. The status message is also sent by RE 304 to SA 302 at flow 5. SA 302 combines the write data and the metadata received from RE 304 and sends the combination to secondary physical storage 308 at flow 6. It is thus clear to one of ordinary skill in the art that, advantageously, the flow of data to and from the RE 304 is avoided, with consequent benefits in processing and bandwidth reductions. To ensure that the write data is preserved in case of power loss while it is "in-flight", all in-flight write data must be preserved in non-volatile storage between flow 2b and flow 6 of FIG. 4.

The Status message sent across the network is used for cross splitter consistency groups, where it is possible that an RE may have been disconnected from another SA.

In the case of a Read issued to an historic view of a primary volume (that is, an instruction to read data, not from the current up-to-date layer, but from layer representing the data at a specified time in the past), a similar beneficial effect can be achieved by the preferred embodiment of the present invention.

Figure 5:
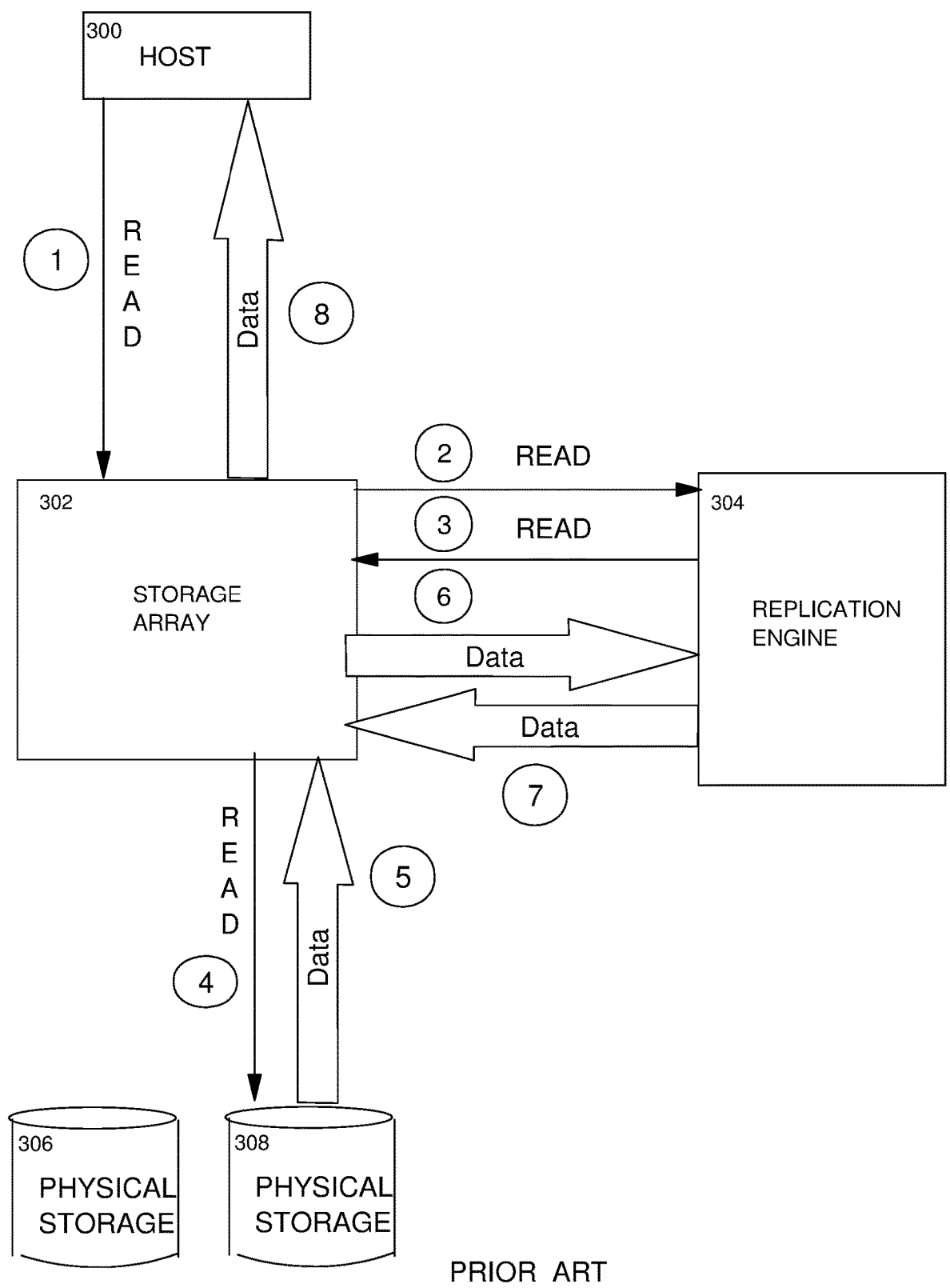
FIG. 5 shows in simplified schematic form the flows of data for a data read from an historic view of a volume preserved using CDP according to the prior art.

Turning to FIG. 5, there are shown the command and data flows according to the prior art for this situation.

In FIG. 5, host 300 issues a READ command specifying an historic view at flow 1. SA 302 flows the READ command to RE 304 at flow 2. RE structures the command according to its data respecting the historic view and flows the READ to SA 302 at flow 3. SA 302 issues the READ to secondary physical storage 308 at flow 4, and secondary physical storage returns the data to SA 302 at flow 5. The data is passed by SA 302 to RE 304 at flow 6 to satisfy the RE's READ, and RE returns the data to SA 302 at flow 7. SA 302 then returns the data to host 300 at flow 8.

Figure 6:
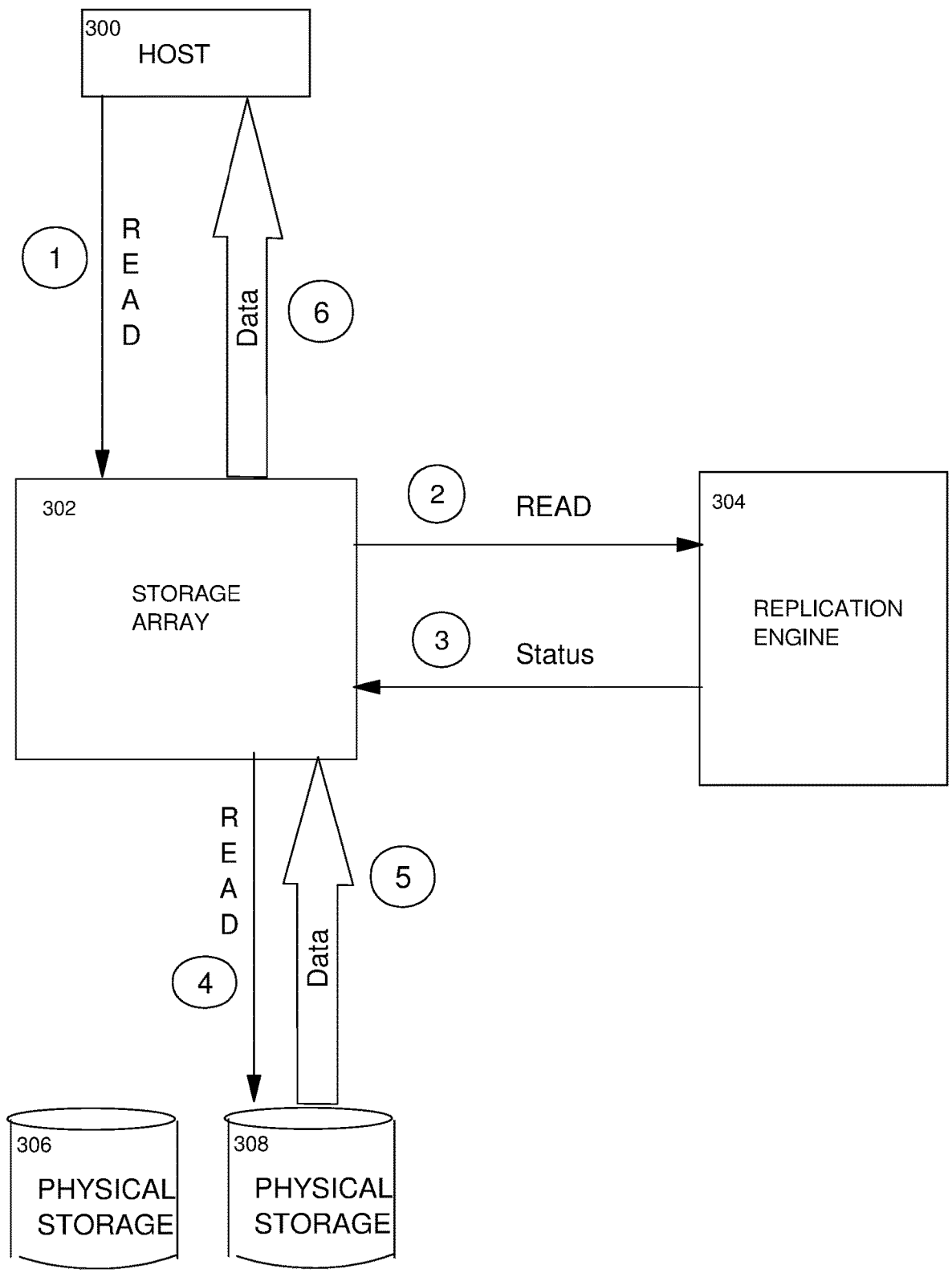
FIG. 6 shows in simplified schematic form the flows of data for a data read from an historic view of a volume preserved using CDP according to a preferred embodiment of the present invention.

Turning to FIG. 6, there are shown the command and data flows according to the preferred embodiment of the present invention for this situation.

In FIG. 6, host 300 sends a READ command to SA 302, which in turn sends the READ command to RE 304 at flow 2. RE 304 sends a status message at flow 3 to SA 302, which issues the READ to secondary physical storage 308 at flow 4. Secondary physical storage 308 returns the requested data to SA 302 at flow 5, and SA returns the requested data to host 300 at flow 6.

It is possible that the RE may have fragmented or striped the data across multiple LUNs or that the RE-assigned LUN has become fragmented within the snapshot area and hence there is a requirement for the RE to be able to specify multiple locations of the host data. Thus the READ that is flowed to the SA 302 from the RE 304 may be a multiple-location READ.

There are occasions when it becomes necessary to issue a write to a secondary volume—for example, when it is necessary for the system to revert to data in an historic view preserved using the CDP functionality. This is the case, for example, when later data has become corrupted and it is necessary to "turn the clock back" in order to continue processing on the basis of earlier, uncorrupted data.

Figure 7:
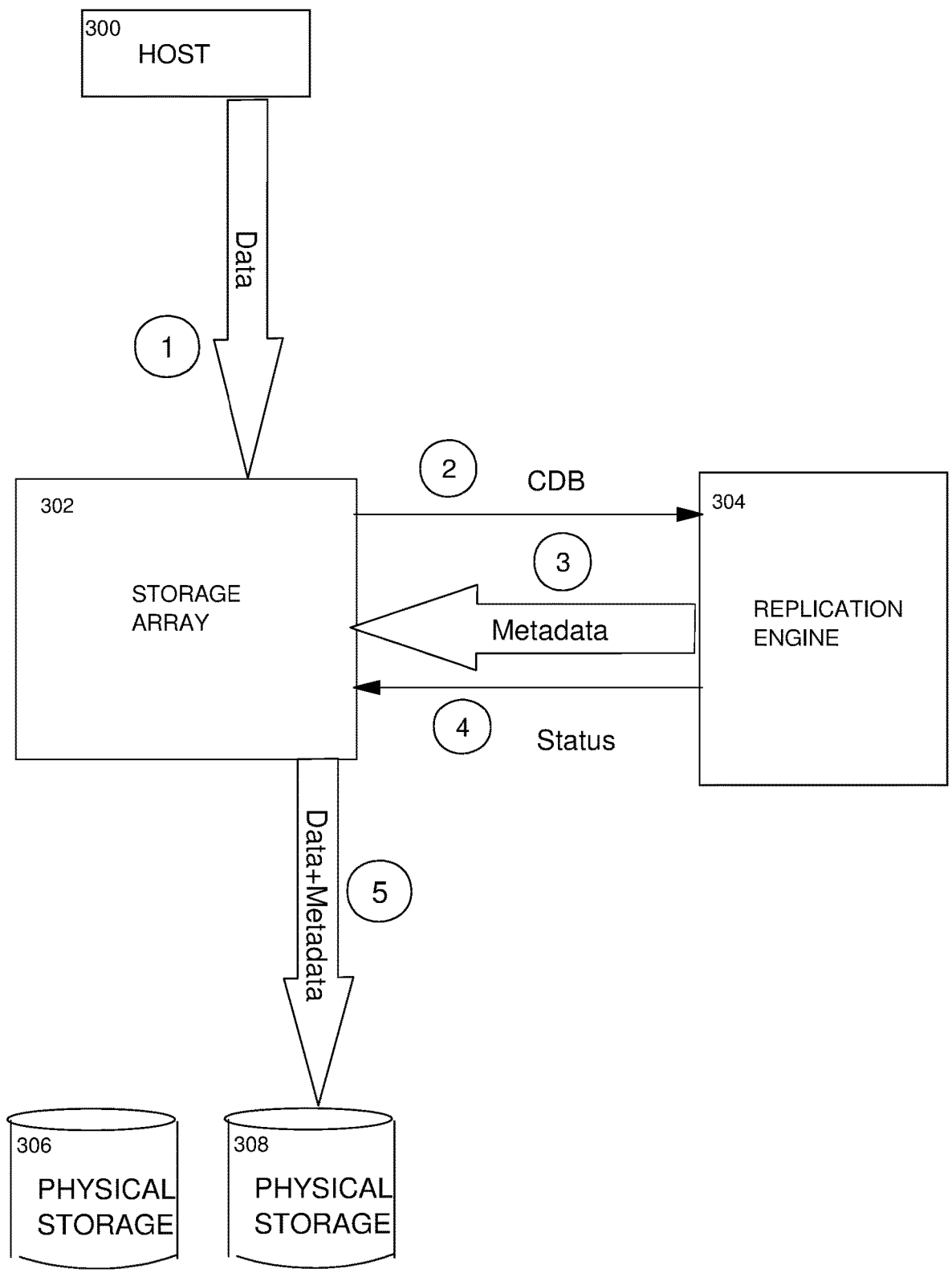
FIG. 7 shows in simplified schematic form the flows of data for a data write to an historic view of a volume preserved using CDP according to a preferred embodiment of the present invention.

Turning to FIG. 7, there are shown the command and data flows according to the preferred embodiment of the present invention for this situation.

In FIG. 7, at flow 1, host 300 sends data to be written to SA 302, which in turn sends the write CDB to RE 304 at flow 2. RE 304 sends metadata at flow 3 and a status message at flow 4 to SA 302, which combines the write data and metadata and writes it to secondary physical storage 308 at flow 5.

In the case when an RE volume (or LUN) becomes out of synchronization with the primary volume (e.g., due to disconnection, it is necessary to resynchronize the RE LUN with the primary volume. During any period of disconnection between an RE and an SA, the SA is obliged to continue processing write I/O requests for the primary volume. While it is disconnected the primary volume will then become out of synchronization with the RE LUN that is storing the CDP data. When a reconnection is detected by the SA, the SA needs to send its DRL (Dirty Region Log) to the RE so the RE knows that writes were received by the SA during the disconnection. The RE then initiates copy requests for each of the regions of the primary volume that are dirty.

Figure 8:
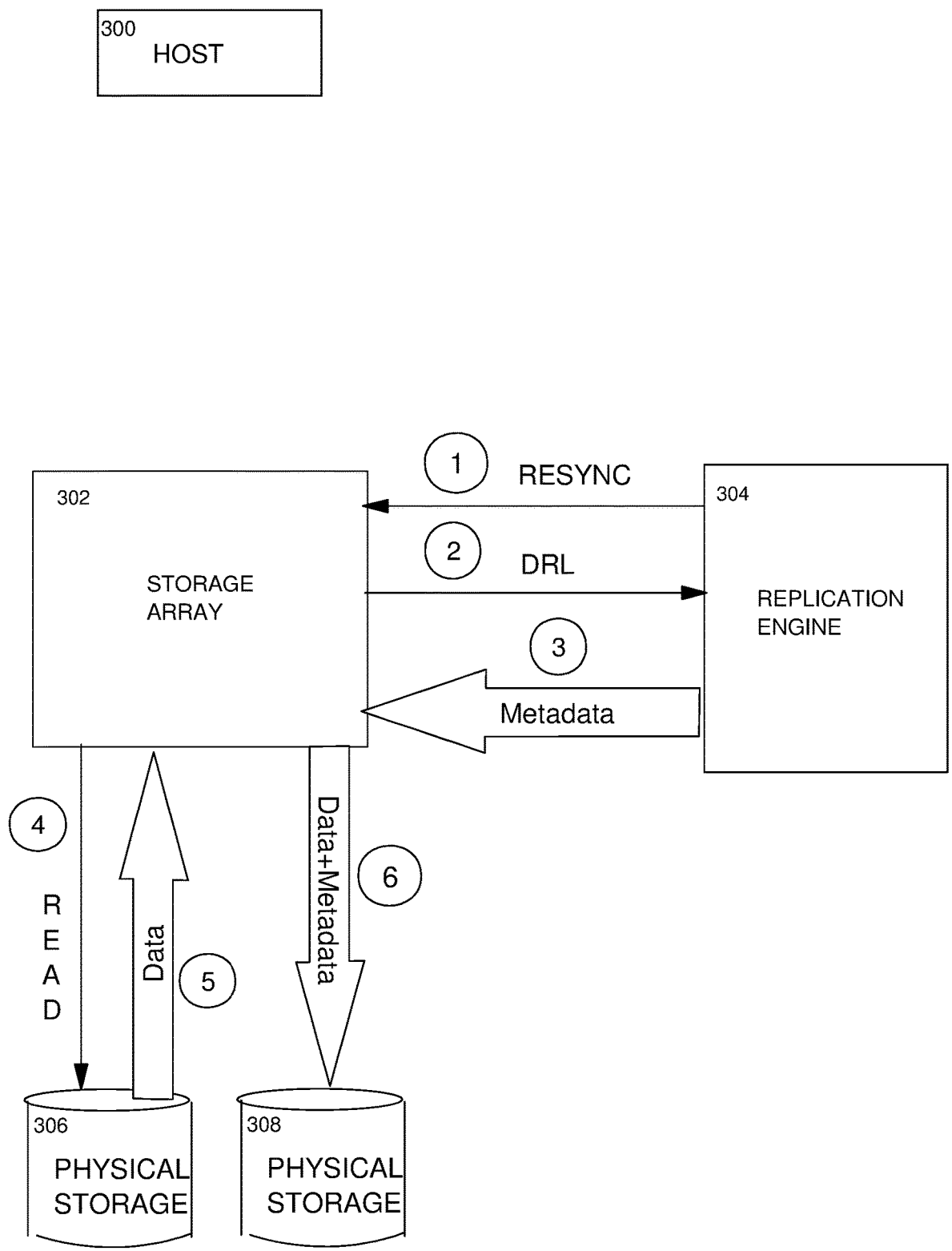
FIG. 8 shows in simplified schematic form the flows of data for a resynchronization of a primary volume with a secondary volume according to a preferred embodiment of the present invention.

The command and data flows for this situation are illustrated in FIG. 8, in which host 300 has been processing write I/Os to primary physical storage 306 during a period when SA 302 and RE 304 have been disconnected—possibly owing to a network disruption or a local failure at the system housing the RE 304. When the connection is re-established, RE 304 requests resynchronization at flow 1. SA 302 responds by sending its Dirty Region Log (DRL) to RE 304 at flow 2. RE 304 sends metadata to SA 302 at flow 3. SA 302 then sends a READ command to primary physical storage 306 at flow 4, and receives the returned data from primary physical storage 306 at flow 5. SA 302 applies the metadata to the data and sends the resulting data and metadata combination for each region that was out of synchronization to secondary physical storage 308 at flow 6.

In similar fashion as for normal write as described above with reference to FIG. 4, the RE needs to wrap header and footer information around the customer data. The SA initiates the read requests to the primary volume, merges the data with the header and footer information supplied by the RE and then initiates the write to the RE LUN storing the CDP data.

The preferred embodiment of the present invention includes a facility for providing configuration instructions to the RE. Some examples of such configuration commands are:

Revert/Rollback primary volume to time point X
Create a history view of a volume, time point X
Snapshot Primary volume
CDP protect this primary volume
Create space efficient volume
Delete space efficient volume For consistency group support where a single RE may be used for multiple SAs, so that SAs are alerted when consistency group synchronization has been broken, a heartbeat mechanism is provided between the RE and the SAs.

In summary, then, some important aspects and advantages of the preferred embodiment of the present invention are as follows:
1. There is a facility for the SA and RE to discover each other on the fabric over which they will communicate or to be configured to know each other's addresses.

2. There is a facility for the SA and the RE to be configured so that the SA knows which primary volumes are configured for copy services, how to split to the RE and how to address the RE.

3. The SA can be configured with some storage space that is for use by the RE as a repository.

4. The SA can be configured to send a message to the RE when a new write command is addressed to a volume for which copy services are configured. This message contains the address being written (target, LUN/LBA) and the length being written but not the data.

5. When the RE receives notification that a new write has been received there is a facility to allow the RE to copy this written data to zero or more places in the repository area. The protocol also allows the RE to write metadata into the repository area associated with the server data.

6. There is a facility to prevent the data being overwritten before the RE has had a chance to copy it. In a preferred embodiment, the RE is allowed to copy the data whilst the write command is still active in the SA and to prevent two simultaneous write commands from writing to the same disk blocks. In this case the RE has to acknowledge the new write before the SA allows the write to complete.

7. There is a facility to allow the RE to copy data in either direction between the repository and the primary volumes and from one place to another on the repository.

8. In case the connection between the RE and the SA is broken it is important that the protocol implements a way to detect and recover. One such way is to implement a heartbeat protocol so that the RE can know that the SA has become disconnected and can know that any writes received from other SAs may be "dependent" upon writes that it has not been informed about. In addition to the heartbeat, the SA must keep a record of any writes that have been received and not sent to the RE. It is acceptable for the SA to coalesce this information up so that only a bitmap of regions is kept indicating which regions have been written to and must be synchronized.

9. Optionally, the protocol can provide a facility to intercept reads so that it is possible to present data to the server that comes from the copy services repository. In this case the protocol provides a facility to intercept reads and return data as directed by the RE.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the spirit and scope of the present invention.

What is claimed is:

1. An apparatus for controlling a storage system having a data replication function, comprising:
   a primary storage location;
   a secondary storage location;
   a replication engine; and
   a storage array component coupled to the primary storage location, the secondary storage location, and the replication engine, the storage array component configured to receive, from a host, a write command to write data to the primary storage location, write the data to the primary storage location, and to send only a command descriptor block (CDB) describing the write command, without sending any portion of the data, to the replication engine in response to receiving the write command, the CDB indicating that the data is subject to data replication in the secondary storage location, wherein:
      the replication engine is configured to receive the CDB and, in response thereto, generate metadata for protecting the data based on the CDB and transmit the generated metadata to the storage array component such that the metadata is generated after the data has been written to the primary storage location yet prior to replicating the data to the secondary storage location, and
      the storage array component is configured to add the generated metadata to the data as the data and the generated metadata is being written to the secondary storage location.

2. The apparatus as claimed in claim 1, wherein the replication engine is configured to utilize the generated metadata to manage protection of the data written to the primary storage location and copied to the secondary storage location.

3. The apparatus as claimed in claim 1, further configured to perform a read of the data, wherein the data is returned by the storage array component to the host without being transmitted to the replication engine.

4. The apparatus as claimed in claim 1, further configured to write data from the host to the secondary storage location and wherein the data is written by the storage array component to the secondary storage location unmediated by the replication engine.

5. The apparatus as claimed in claim 1, further configured to resynchronize data between the primary storage location and the secondary storage location and wherein the data is transferred by the storage array component from the primary storage location to the secondary storage location unmediated by the replication engine.

6. A method for controlling a storage system having a data replication function, comprising the steps of:
   receiving, by a storage array component, a write command to write data to a primary storage location from a host;
   writing the data, by the storage array component, to the primary storage location;
   sending, by the storage array component, only a command descriptor block (CDB) describing the write command, without sending any portion of the data, to a replication engine in response to receiving the write command, the CDB indicating that the data is subject to data replication in a secondary storage location;
   receiving the CDB by the replication engine;
   generating metadata for protecting the data based on the CDB and in response to receiving the CDB such that the metadata is generated after the data has been written to the primary storage location yet prior to replicating the data to the secondary storage location;
   transmitting the generated metadata from the replication engine to the storage array component; and
   adding, by the storage array component, the generated metadata to the data as the data and the generated metadata is being written to the secondary storage location.

7. The method as claimed in claim 6, further comprising managing the data written to the primary storage location and copied to the secondary storage location, by the replication engine, utilizing the generated metadata.

8. The method as claimed in claim 6, further comprising performing a read of the data, wherein the data is returned by the storage array component to the host without being transmitted to the replication engine.

9. The method as claimed in claim 6, further comprising writing data from the host to a secondary storage location and wherein the data is written by the storage array component to the secondary storage location unmediated by the replication engine.

10. The method as claimed in claim 6, further comprising resynchronizing data between the primary storage location and the secondary storage location and wherein the data is transferred by the storage array component from the primary storage location to the secondary storage location unmediated by the replication engine.

11. A computer program product, stored on a non-transitory computer-readable medium, comprising computer program code to, when loaded into a computer system and executed thereon, cause the computer system to control a storage system having a data replication function, said computer program code performing the steps of:
   receiving, by a storage array component, a write command to write data to a primary storage location from a host;
   writing the data, by the storage array component, to the primary storage location;
   sending, by the storage array component, only a command descriptor block (CDB) describing the write command, without sending any portion of the data, to a replication engine in response to receiving the write command, the CDB indicating that the data is subject to data replication in a secondary storage location;
   receiving the CDB by the replication engine;
   generating metadata for the data based on the CDB and in response to receiving the CDB such that the metadata is generated after the data has been written to the primary storage location yet prior to replicating the data to the secondary storage location;
   transmitting the generated metadata from the replication engine to the storage array component; and
   adding, by the storage array component, the generated metadata to the data as the data and the generated metadata is being written to the secondary storage location.

12. The computer program product as claimed in claim 11, further comprising managing the data written to the primary storage location and copied to the secondary storage location, by the replication engine, utilizing the generated metadata.

13. The computer program product as claimed in claim 11, further comprising performing a read of the data, wherein the data is returned by the storage array component to the host without being transmitted to the replication engine.

14. The computer program product as claimed in claim 11, further comprising writing data from the host to a secondary storage location and wherein the data is written by the storage array component to the secondary storage location unmediated by the replication engine.

15. The computer program product as claimed in claim 11, further comprising resynchronizing data between the primary storage location and the secondary storage location and wherein the data is transferred by the storage array component from the primary storage location to the secondary storage location unmediated by the replication engine.

* * * * *